(12) United States Patent
Nori et al.

(10) Patent No.: US 10,923,113 B1
(45) Date of Patent: Feb. 16, 2021

(54) SPEECHLET RECOMMENDATION BASED ON UPDATING A CONFIDENCE VALUE

(71) Applicant: Amazon Technologies, Inc., Seattle, WA (US)

(72) Inventors: Srikanth Nori, Fullerton, CA (US); Kevin Boehm, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 206 days.

(21) Appl. No.: 15/952,633

(22) Filed: Apr. 13, 2018

(51) Int. Cl.
| | |
|---|---|
| *G10L 15/30* | (2013.01) |
| *H04L 12/58* | (2006.01) |
| *H04M 3/51* | (2006.01) |
| *G10L 15/18* | (2013.01) |
| *G10L 15/22* | (2006.01) |
| *G10L 13/00* | (2006.01) |
| *G10L 15/08* | (2006.01) |

(52) U.S. Cl.
CPC .......... *G10L 15/1815* (2013.01); *G10L 13/00* (2013.01); *G10L 15/22* (2013.01); *G10L 15/08* (2013.01); *G10L 2015/223* (2013.01); *H04M 3/5191* (2013.01)

(58) Field of Classification Search
CPC ......... G10L 15/30; G10L 15/08; H04L 51/02; H04L 51/046; H04M 3/5191
See application file for complete search history.

(56) References Cited

U.S. PATENT DOCUMENTS

| | | | | |
|---|---|---|---|---|
| 2017/0324868 | A1* | 11/2017 | Tamblyn | H04M 3/58 |
| 2018/0316631 | A1* | 11/2018 | Koukoumidis | H04L 51/02 |
| 2018/0358010 | A1* | 12/2018 | Eidem | G10L 15/30 |
| 2019/0172240 | A1* | 6/2019 | Kitajima | G10L 15/08 |
| 2019/0306341 | A1* | 10/2019 | Matysiak | H04L 51/046 |

* cited by examiner

Primary Examiner — Farzad Kazeminezhad
(74) Attorney, Agent, or Firm — Pierce Atwood LLP

(57) ABSTRACT

Techniques for recommending speechlets to users via voice user interfaces (VUIs) are described. A system may include predetermined rankings of speechlets. The predetermined rankings may be determined offline and may represent reliabilities of the speechlets. During runtime, when the system receives a user input that can be handled by multiple speechlets, the system may determine a type of speechlet configured to handle the user input. The system may also identify information specific to the user's previous interactions with the system. The system may rerank the predetermined rankings using the user specific information, as well as other information. The system may recommend speechlets to the user based on the speechlets' rerankings. The system may first recommend the top reranked speechlet. If the user accepts the recommendation, the system may cause the top reranked speechlet to handle the original user input. If the user declines the recommendation, the system may recommend the next top reranked speechlet to the user. The system may work its way down the rerankings of the speechlets until the user accepts a recommendation, until the system recommends all of the reranked speechlets, or until the user indicates the system should stop recommending speechlets.

20 Claims, 11 Drawing Sheets

Music
- Music speechlet component 1 identifier (0.8)
- Music speechlet component 2 identifier (0.65)
- Music speechlet component 3 identifier (0.54)

Gaming
- Game speechlet component 1 identifier (High)
- Game speechlet component 2 identifier (Medium)
- Game speechlet component 3 identifier (Low)

Weather
- Weather speechlet component 1 identifier (0.83)
- Weather speechlet component 2 identifier (0.8)
- Weather speechlet component 3 identifier (0.79)

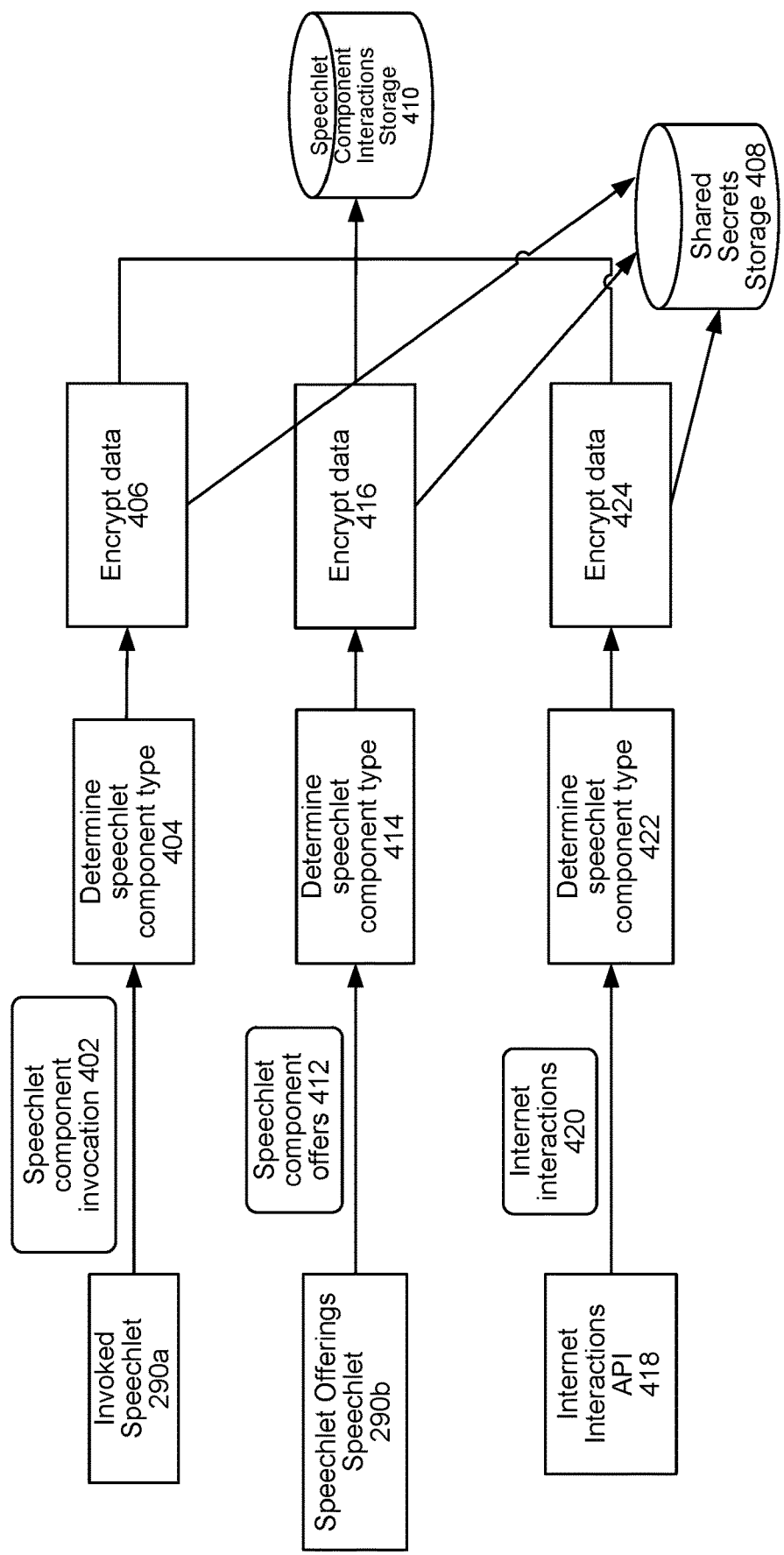

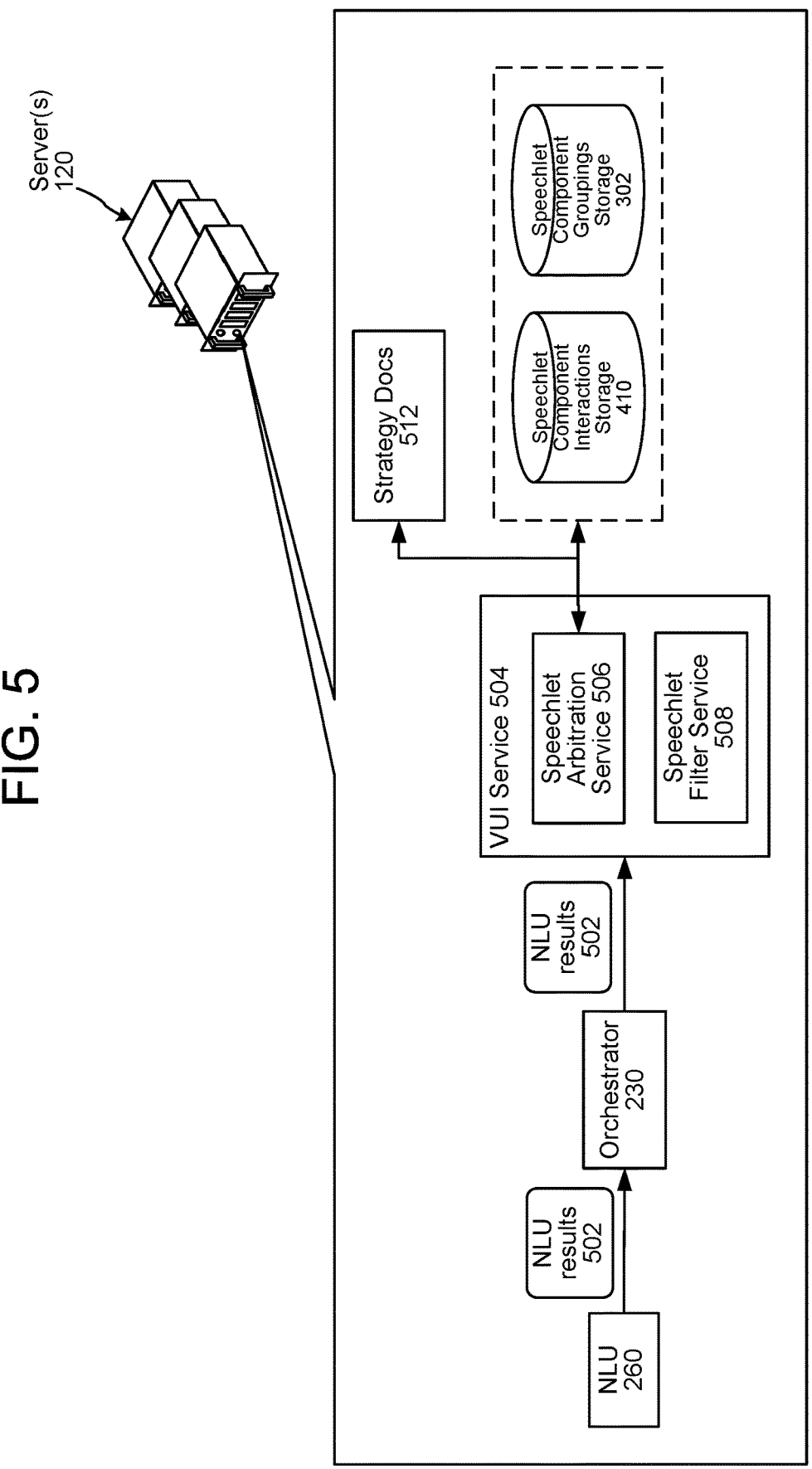

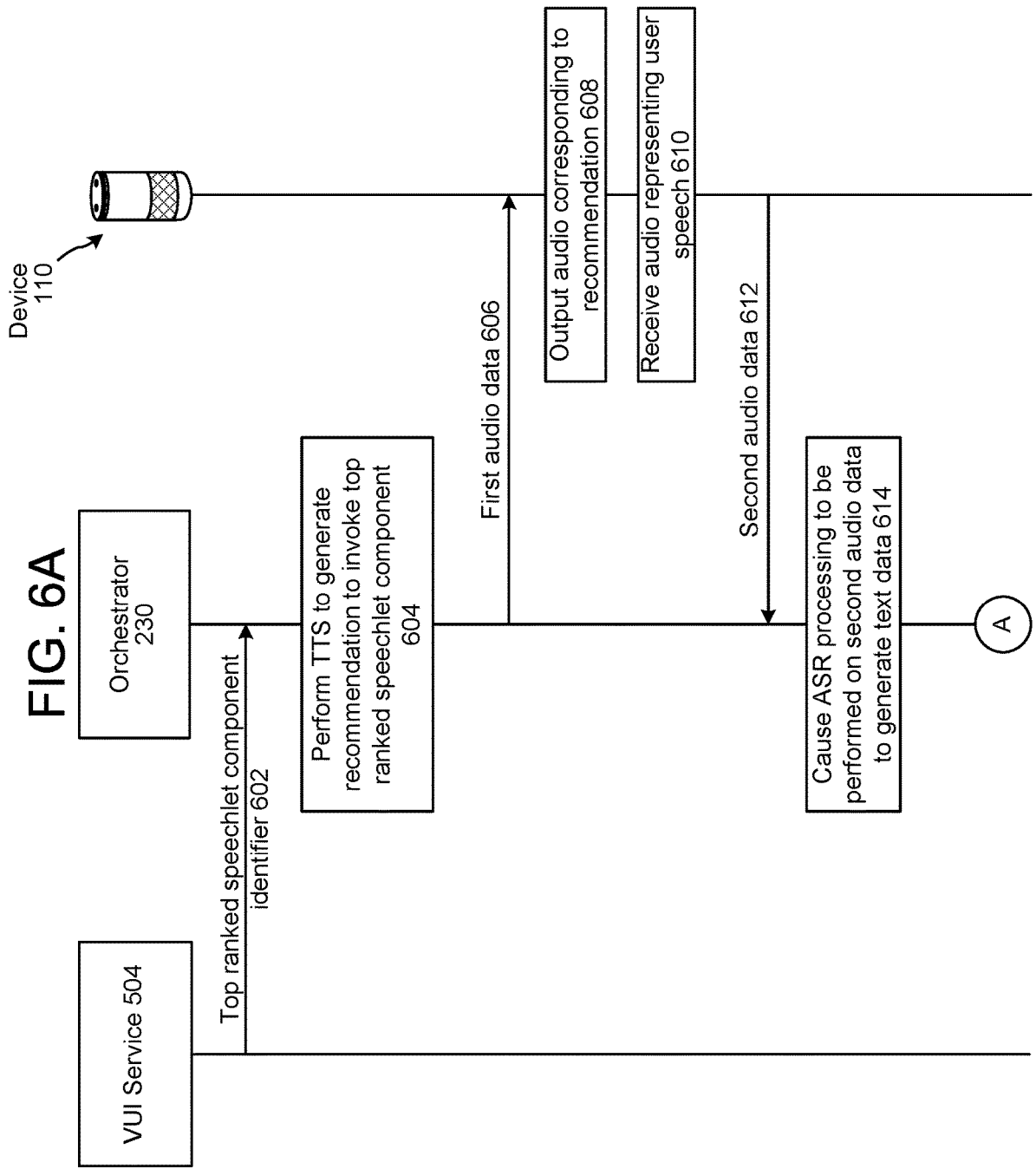

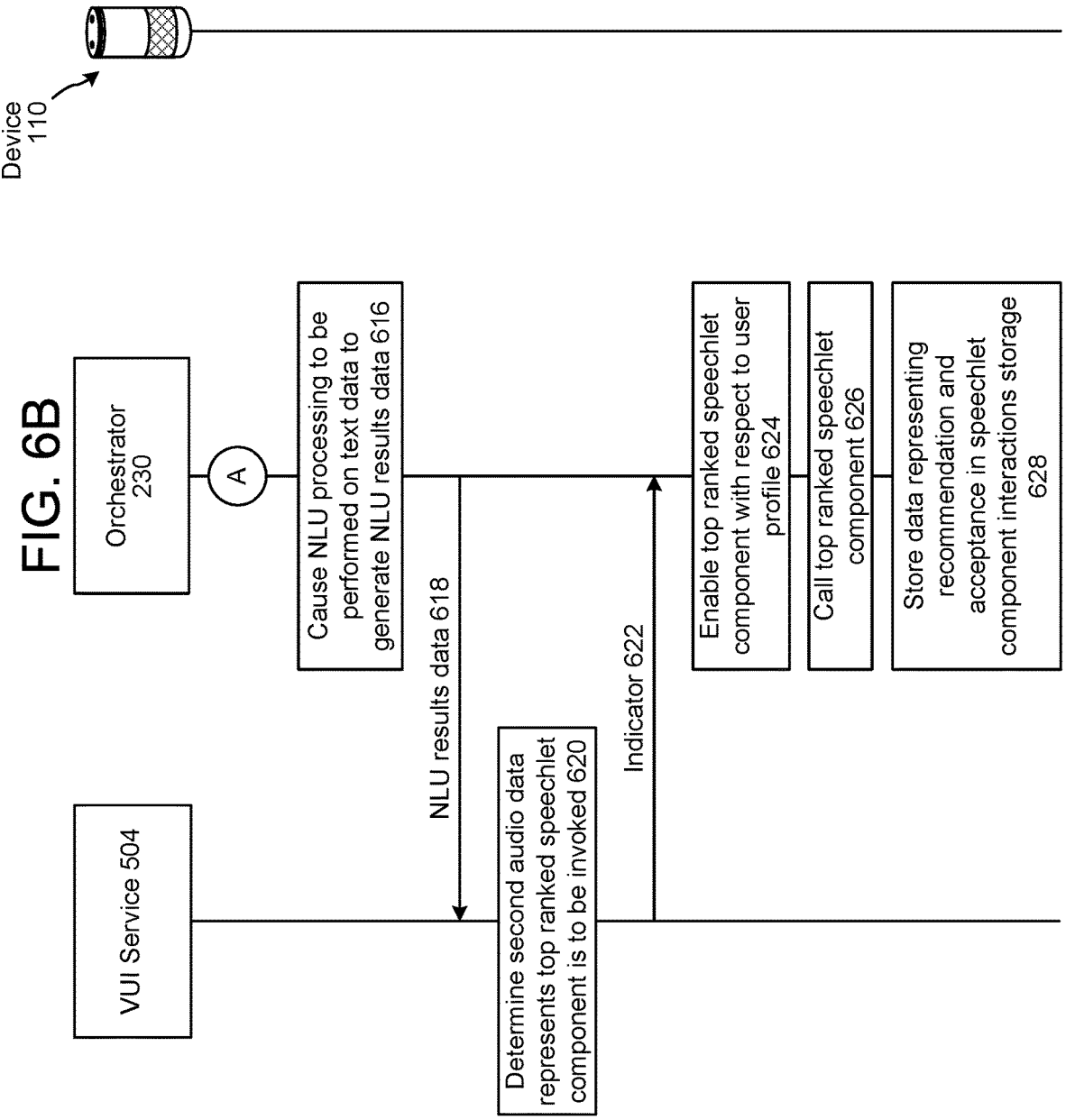

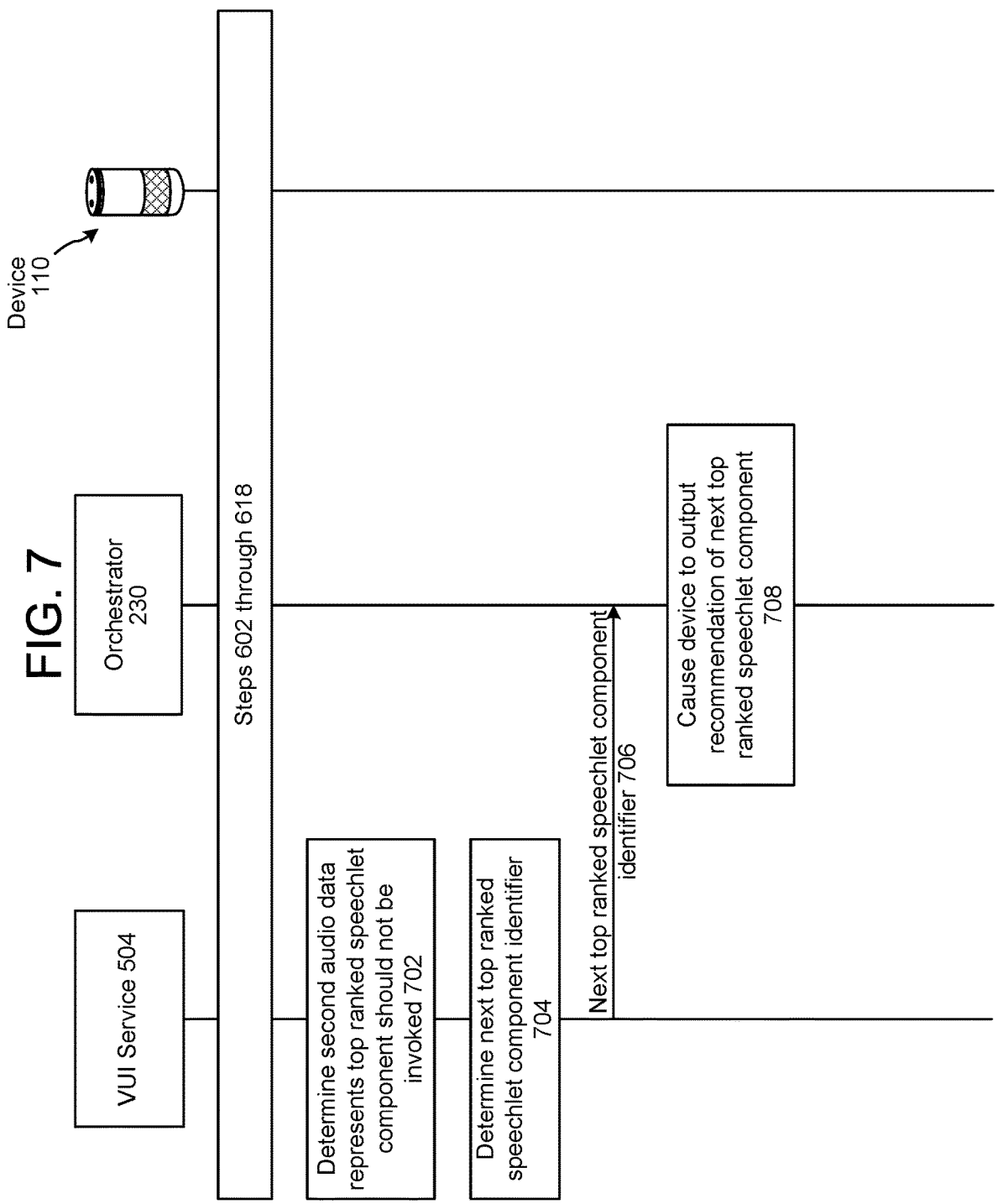

SPEECHLET RECOMMENDATION BASED ON UPDATING A CONFIDENCE VALUE

BACKGROUND

Speech recognition systems have progressed to the point where humans can interact with computing devices using their voices. Such systems employ techniques to identify the words spoken by a human user based on the various qualities of a received audio input. Speech recognition processing combined with natural language understanding processing enable speech-based user control of computing devices to perform tasks based on the user's spoken commands. The combination of speech recognition processing and natural language understanding processing techniques is referred to herein as speech processing. Speech processing may also involve converting a user's speech into text data which may then be provided to speechlets.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 4 is a conceptual diagram of processing performed to generate speechlet interaction data according to embodiments of the present disclosure.

FIG. 5 is a conceptual diagram of how a speechlet is determined for recommendation to a user according to embodiments of the present disclosure.

FIGS. 6A and 6B are a signal flow diagram illustrating the recommendation of a top ranked speechlet to a user and the processes performed when the user desires the top ranked speechlet be invoked according to embodiments of the present disclosure.

FIG. 7 is a signal flow diagram illustrating the processing performed when the user indicates the top ranked speechlet should not be invoked according to embodiments of the present disclosure.

DETAILED DESCRIPTION

Figure 1:
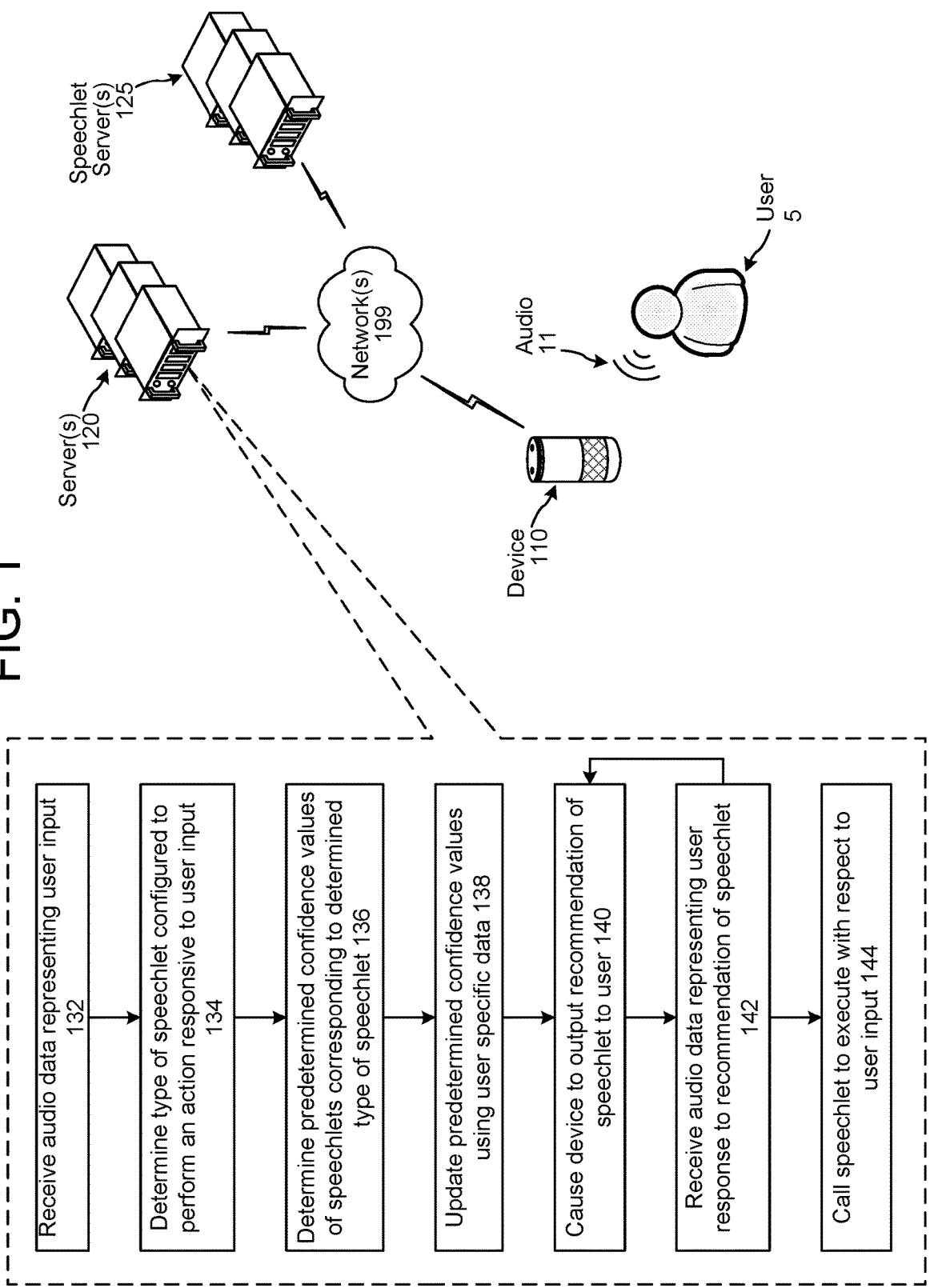
FIG. 1 is a conceptual diagram of a system configured to recommend speechlets to a user according to embodiments of the present disclosure.

Automatic speech recognition (ASR) is a field of computer science, artificial intelligence, and linguistics concerned with transforming audio data representing speech into text data representative of that speech. Natural language understanding (NLU) is a field of computer science, artificial intelligence, and linguistics concerned with enabling computers to derive meaning from text data containing natural language. Text-to-speech (TTS) is a field of computer science, artificial intelligence, and linguistics concerned with enabling computers to output synthesized speech. ASR, NLU, and TTS may be used together as part of a speech processing system.

Certain systems are configured to receive user inputs as speech and cause speechlets (e.g., skills) to perform actions responsive to the user inputs. Such actions include providing information to a user, booking a reservation for a user, outputting music to a user, etc.

A system may be configured with various speechlets. The speechlets may fit into various types (e.g., categories). Types of speechlets include gaming speechlets, home automation speechlets, ride sharing speechlets, restaurant booking speechlets, etc. A system may include multiple speechlets of the same type.

Certain systems may require a user input specifically refer to a speechlet in order for the system to task the speechlet with performing an action responsive to the user input. Certain systems may also require a user enable a speechlet in order for the system to have permission to cause the speechlet to perform an action responsive to the user's inputs.

A user may provide a system with an input that may be handled by multiple speechlets. For example, a user may say "I want to play a game." The system may include multiple gaming speechlets that may handle the user input.

In a graphical user interface (GUI) implementation, the system may provide the user with a list of speechlets than can handle the user input and the user may indicate which speechlet should handle the user input. According to the foregoing example, the system may present the user with a list of gaming speechlets and the user may select a gaming speechlet the user wants to play.

The present disclosure improves systems to recommend speechlets to users via voice user interfaces (VUIs) in response to spoken user inputs. In the VUI context, it may be difficult to indicate to a user the different speechlets that are capable of handling the spoken user input. The present disclosure provides techniques for recommending speechlets to users that enable systems to determine which speechlets to recommend with reduced latency as well as enable systems to provide desirable user experiences.

A system may include predetermined rankings of speechlets. The predetermined rankings may represent the reliabilities of the speechlets. Moreover, the predetermined rankings may be segmented based on speechlet type. Thus, the system may include tables, with each table representing speechlets of a particular type and their respective scores. Predetermination of the rankings may be performed offline.

During runtime, when the system receives a user input that can be handled by multiple speechlets, the system may determine a type of speechlet configured to handle the user input. For example, if the user input corresponds to "I want to play a game," the system may determine gaming speechlets are configured to handle the user input.

The system may identify information specific to the user's previous interactions with the system. Such information may represent: previous instances when the user invoked particular speechlets of the type capable of handling the present user input; previous instances when the user was recommended a speechlet of the type, capable of handling the present user input, and the user's response (e.g., acceptance or declination of the recommendation); and previous instances when the user viewed information specific to speechlets, of the type capable of handling the present user input, via a companion application or internet webpage.

The system may rerank the predetermined rankings using the user specific information at runtime. By establishing the predetermined rankings offline, the system is able to rerank the speechlets at runtime with reduced latency. Reranking of the speechlets based on user specific data (and other data) differentiates the speechlets when the speechlets may be rather similar in the functions they provide. Reranking of speechlets improves a system by enabling the system to recommend relevant speechlets with greater probability and frequency.

The system may recommend speechlets to the user based on the speechlets' rerankings. For example, the system may first recommend the top reranked speechlet. If the user accepts the recommendation, the system may cause the top reranked speechlet to handle the original user input. If the user declines the recommendation, the system may recommend the next top reranked speechlet to the user. The system may work its way down the rerankings of the speechlets until the user accepts a recommendation, until the system recommends all of the reranked speechlets, or until the user indicates the system should stop recommending speechlets. By iterating recommendations to the user, the system is able to recommend speechlets in a decreasing order of relevance to the user. Moreover, by iterating recommendations, the system is able to provide a desirable user experience, as compared to outputting synthesized speech that simply "rambles" through all the speechlets that can handle the user input. Iterating the recommendations allows the user to make an informed decision regarding which speechlet to invoke.

FIG. 1 illustrates a system configured to recommend speechlets to a user. Although the figures and discussion of the present disclosure illustrate certain operational steps of the system in a particular order, the steps described may be performed in a different order (as well as certain steps removed or added) without departing from the intent of the disclosure. A device 110 local to a user 5, one or more servers 120, and one or more speechlet servers 125 may communicate across one or more networks 199.

The device 110 may capture audio 11 corresponding to a spoken user input of the user 5. The device 110 may generate audio data corresponding to the audio 11 and send the audio data to the server(s) 120, which the server(s) 120 receives (132).

The server(s) 120 determines (134) a type of speechlet configured to perform an action responsive to the user input. The server(s) 120 may perform ASR processing on the audio data to generate text data and perform NLU processing on the text data to determine an intent of the user 5. The server(s) 120 may determine a type of speechlet configured to execute with respect to the intent.

The server(s) 120 determines (136) predetermined confidence values of the speechlets corresponding to the determined type. The predetermined confidence values may be established offline. Each predetermined confidence value may represent a reliability of the speechlet associated with the confidence value. The system may be configured to generate such a confidence value based on credentialing of the speechlet, feedback provided by various users of the system over time, and other parameters. Since credentialing and feedback of a speechlet may change over time, the system may update the confidence value of the speechlet over time during offline operations.

The server(s) 120 updates (138) the predetermined confidence values using user specific data, as well as other data. The user specific data may include data representing previous instances when the user 5 specifically invoked a speechlets, instances when the user 5 was previously recommended speechlets, and whether the user 5 accepted or declined the previous recommendations.

The server(s) 120 causes (140) the device 110 to output a recommendation of a speechlet to the user 5. The server(s) 120 may cause the device 110 to recommend the user 5 invoke the top ranked speechlet.

The device 110 may capture further audio 11 corresponding to speech of the user 5 representing whether the user 5 desires the system invoke the recommended speechlet or whether the user 5 desires the system not invoke the recommended speechlet. The device 110 generates audio data representing the audio and sends the audio data to the server(s) 120, which the server(s) 120 receives (142).

If the server(s) 120 determines the user's response represents the speechlet should be invoked, the server(s) 120 calls (144) the speechlet to execute with respect to the user input received at step 132. Conversely, if the server(s) 120 determines the user's response represents the speechlet should not be invoked, the server(s) 120 may cause (140) the device 110 to output a further recommendation to invoke the next top ranked speechlet. Steps 140 and 142 may be repeated until the user 5 indicates the server(s) 120 should invoke a recommended speechlet, until the server(s) 120 has recommended all ranked speechlets, or until the user 5 indicates the server(s) 120 should stop recommending speechlets that can execute with respect to the user input received at step 132.

Figure 2:
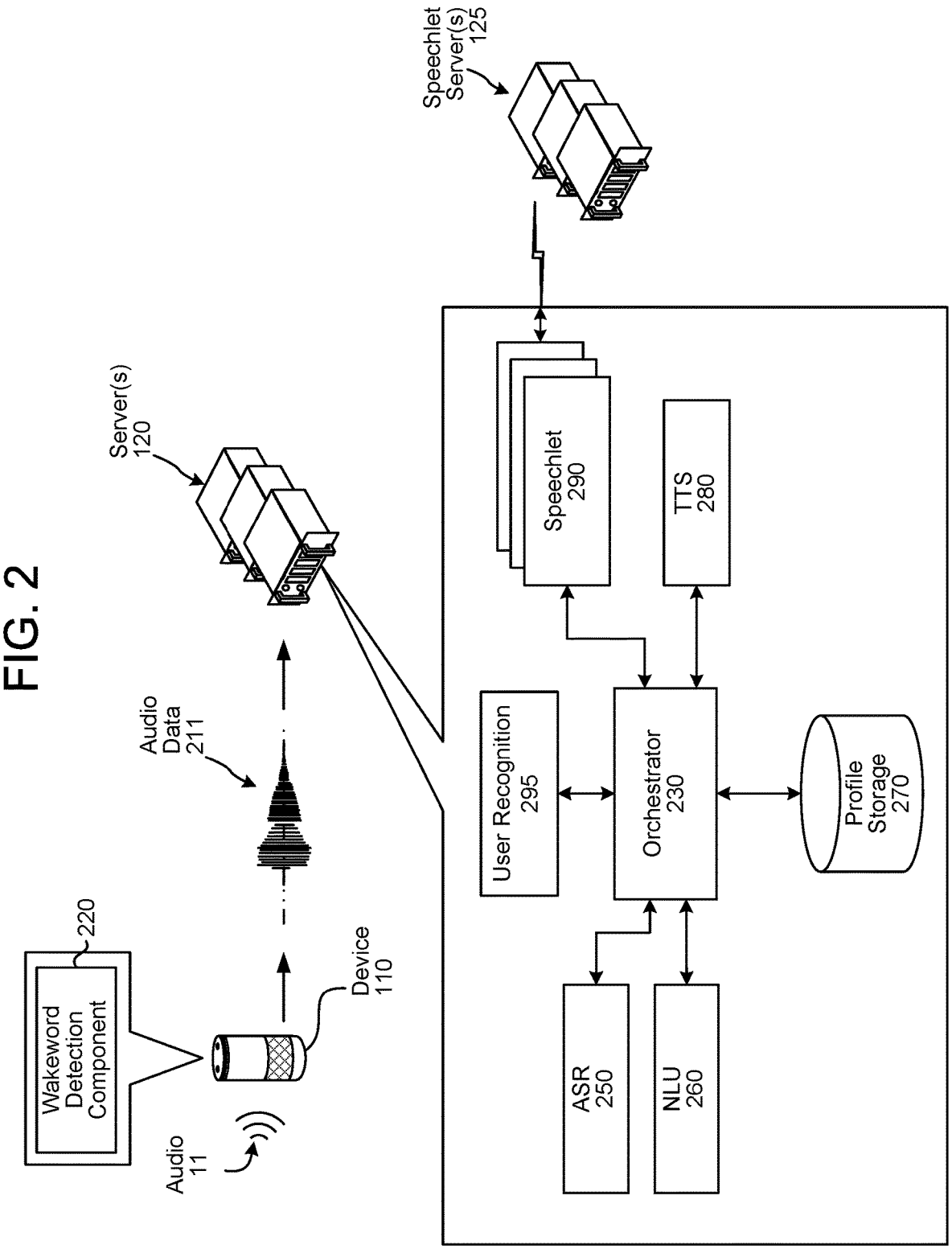
FIG. 2 is a conceptual diagram of components of a system according to embodiments of the present disclosure.

The system may operate using various components as described in FIG. 2. The various components may be located on same or different physical devices. Communication between various components may occur directly or across a network(s) 199.

An audio capture component(s), such as a microphone or array of microphones of the device 110, captures audio 11. The device 110 processes audio data, representing the audio 11, to determine whether speech is detected. The device 110 may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. This process may also be referred to as keyword detection, with a wakeword being a specific example of a keyword. An example wakeword is "Alexa."

Wakeword detection is typically performed without performing linguistic analysis, textual analysis, or semantic analysis. Instead, the audio data representing the audio 11 is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the server(s) 120. The audio data 211 may include data corresponding to the wakeword, or the portion of the audio data 211 corresponding to the wakeword may be removed by the device 110 prior to sending the audio data 211 to the server(s) 120.

Upon receipt by the server(s) 120, the audio data 211 may be sent to an orchestrator component 230. The orchestrator component 230 may include memory and logic that enable the orchestrator component 230 to transmit various pieces and forms of data to various components of the system, as well as perform other operations.

The orchestrator component 230 sends the audio data 211 to an ASR component 250. The ASR component 250 transcribes the audio data 211 into text data. The text data output by the ASR component 250 represents one or more than one (e.g., in the form of an N-best list) hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 sends the text data generated thereby to an NLU component 260, for example via the orchestrator component 230. The text data sent from the ASR component 250 to the NLU component 260 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

The NLU component 260 attempts to make a semantic interpretation of the phrases or statements represented in the text data input therein. That is, the NLU component 260 determines one or more meanings associated with the phrases or statements represented in the text data based on words represented in the text data. The NLU component 260 determines an intent representing an action that a user desires be performed as well as pieces of the input text data that allow a device (e.g., the device 110, the server(s) 120, the speechlet server(s) 125, etc.) to execute the intent. For example, if the text data corresponds to "call John," the NLU component 260 may determine an intent that the system establish a two-way communication channel between the device 110 originating the call and a device of the recipient "John." For further example, if the text data corresponds to "what is the weather," the NLU component 260 may determine an intent that the system output weather information.

The NLU component 260 outputs NLU results to the orchestrator component 230. The NLU results may include an NLU hypothesis, including a representation of an intent and corresponding slotted data that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 260 in the processing performed to generate the NLU hypothesis associated with the confidence value.

The orchestrator component 230 may send the NLU results to an associated speechlet component 290. If the NLU results include multiple NLU hypotheses, the orchestrator component 230 may send a portion of the NLU results corresponding to the top scoring NLU hypothesis to a speechlet component 290 associated with the top scoring NLU hypothesis.

A "speechlet" or "speechlet component" may be software running on the server(s) 120 that is akin to a software application running on a traditional computing device. That is, a speechlet component 290 may enable the server(s) 120 to execute specific functionality in order to perform one or more actions (e.g., provide information to a user, display content to a user, output music, or perform some other requested action). The server(s) 120 may be configured with more than one speechlet component 290. For example, a weather speechlet component may enable the server(s) 120 to provide weather information, a ride sharing speechlet component may enable the server(s) 120 to schedule a trip with respect to a ride sharing service, a restaurant speechlet component may enable the server(s) 120 to order food with respect to a restaurant's online ordering system, a communications speechlet component may enable the system to perform messaging or multi-endpoint communications, etc. A speechlet component 290 may operate in conjunction between the server(s) 120 and other devices such as the device 110 or a speechlet server(s) 125 in order to complete certain functions. Inputs to a speechlet component 290 may come from various interactions and input sources.

The functionality described herein as a speechlet or speechlet component may be referred to using many different terms, such as an action, bot, app, or the like.

A speechlet component 290 may include hardware, software, firmware, or the like that may be dedicated to the particular speechlet component 290 or shared among different speechlet components 290. A speechlet component 290 may be part of the server(s) 120 (as illustrated in FIG. 2) or may be located at whole (or in part) with one or more separate servers (e.g., the speechlet server(s) 125). Unless expressly stated otherwise, reference to a speechlet, speechlet device, or speechlet component may include a speechlet component operating within the server(s) 120 (for example as speechlet component 290) and/or speechlet component operating within a server(s) separate from the server(s) 120.

A speechlet component 290 may be configured to perform one or more actions. An ability to perform such action(s) may sometimes be referred to as a "skill." A skill may enable a speechlet component 290 to execute specific functionality in order to provide data or produce some other output requested by a user. A particular speechlet component 290 may be configured to execute more than one skill. For example, a weather skill may involve a weather speechlet component providing weather information to the server(s) 120, a ride sharing skill may involve a ride sharing speechlet component scheduling a trip with respect to a ride sharing service, an order pizza skill may involve a restaurant speechlet component ordering pizza with respect to a restaurant's online ordering system, etc.

A speechlet component 290 may implement different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, gaming skills, as well as custom skills that are not associated with any pre-configured type of skill.

The server(s) 120 may include a TTS component 280 that generates audio data (e.g., synthesized speech) from text data using one or more different methods. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The server(s) 120 may include profile storage 270. The profile storage 270 may include a variety of information related to individual users, groups of users, etc. that interact with the system.

The profile storage 270 may include one or more user profiles, with each user profile being associated with a different user identifier. Each user profile may include various user identifying information. Each user profile may also include preferences of the user. Each user profile may also include one or more device identifiers, representing one or more devices of the user.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the component(s) of the system(s) and/or user are located.

The server(s) 120 may include a user recognition component 295 that recognizes one or more users associated with data input to the system. The user recognition component 295 may take as input the audio data 211 and/or text data output by the ASR component 250. The user recognition component 295 determines scores indicating whether user input originated from a particular user. For example, a first score may indicate a likelihood that the user input originated from a first user, a second score may indicate a likelihood that the user input originated from a second user, etc. The user recognition component 295 also determines an overall confidence regarding the accuracy of user recognition operations. The user recognition component 295 may perform user recognition by comparing audio characteristics in the audio data 211 to stored audio characteristics of users. The user recognition component 295 may also perform user recognition by comparing biometric data (e.g., fingerprint data, iris data, etc.), received by the system in correlation with the present user input, to stored biometric data of users. The user recognition component 295 may further perform user recognition by comparing image data (e.g., including a representation of at least a feature of a user), received by the system in correlation with the present user input, with stored image data including representations of features of different users. The user recognition component 295 may perform additional user recognition processes, including those known in the art. Output of the user recognition component 295 may include a single user identifier corresponding to the most likely user that originated the present user input. Alternatively, output of the user recognition component 295 may include an N-best list of user identifiers with respective scores indicating likelihoods of respective users originating the present user input. The output of the user recognition component 295 may be used to inform NLU processing as well as processing performed by other components of the system.

The system may be configured to implement a variety of different types of speechlet components. For example, the system may implement various music speechlet components, various gaming speechlet components, various weather speechlet components, etc. The system may include a storage of speechlet components grouped based on type.

Figure 3:
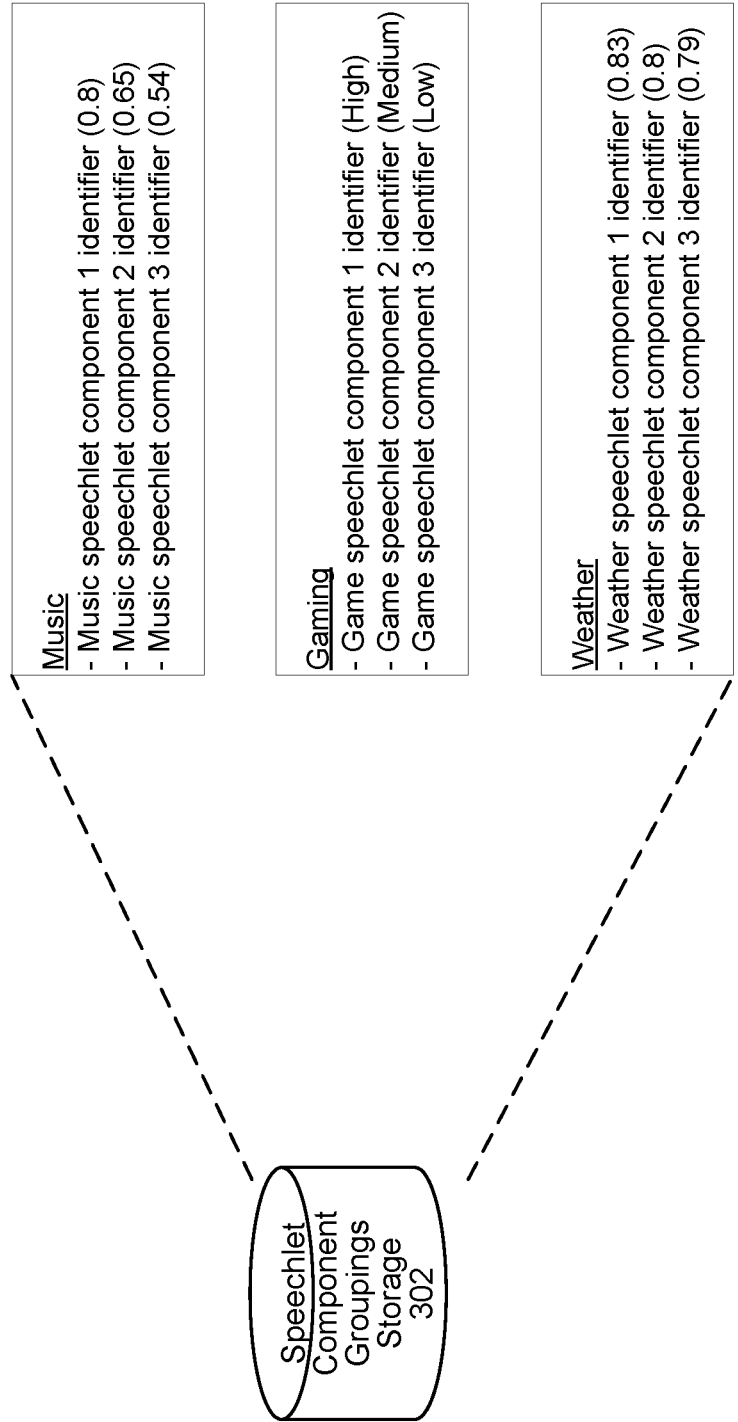
FIG. 3 is a conceptual diagram of example groupings of speechlet component identifiers according to embodiments of the present disclosure.

FIG. 3 illustrates example groupings of speechlet component identifiers. The server(s) 120 may include speechlet component groupings storage 302 that stores speechlet component identifiers based on type. Each grouping may be specific to speechlet components of a particular type. A speechlet component may be represented in the speechlet component groupings storage 302 by its speechlet component identifier. For example, as illustrated, the speechlet component groupings storage 302 may include a grouping of music speechlet component identifiers, a grouping of gaming speechlet component identifiers, and a grouping of weather speechlet component identifiers. Other groupings of speechlet component identifiers are also possible.

Each speechlet component identifier may be associated with a respective confidence value. A confidence value, and other values described herein, may be a numeric value (e.g., on a scale of 0 to 1, or some other scale) or may be a binned value (e.g., high, medium, low.).

A confidence value, associated with a speechlet component identifier in the speechlet component groupings storage 302, may represent a reliability of the associated speechlet component. A confidence value represented in the speechlet component groupings storage 302 may be generated offline (e.g., not using runtime operations). Moreover, a confidence value represented in the speechlet component groupings storage 302 may be generated based on input received from an individual that is employed by an entity that maintains and controls the server(s) 120. A confidence value may also be influenced based on inputs provided by various users of the system, with the inputs representing the users' ranking of the speechlet component associated with the confidence value.

FIG. 3 illustrates each grouping of speechlet component identifiers including the same number of speechlet component identifiers. One skilled in the art will appreciate that groupings of speechlet component identifiers may include various numbers of speechlet component identifiers. A number of speechlet component identifiers in a single grouping may depend on the number of speechlet components the system implements that are associated with the speechlet component type. For example, the system may implement more gaming speechlet components than music speechlet components.

The speechlet component identifiers represented in a grouping may change over time as more speechlet components become available to the system. Updating of the groupings in the speechlet component groupings storage 302 may occur offline.

At runtime, the system may use various information to determine which speechlet component should be recommended to a user. The system may accumulate various information over time based on different data streams. FIG. 4 illustrates processing performed at runtime to generate speechlet component interactions data that may be later used to determine which speechlet component to recommend to a user.

A user may provide the system with a user input that invokes a particular speechlet component 290a. Sometime after the speechlet component 290a is called by the orchestrator component 230 to execute with respect to the user input, the speechlet component 290a may output data 402 representing the speechlet component 290a was invoked. The data 402 may include the speechlet component's unique identifier, a user identifier of the user that originated the user input that caused the speechlet component 290a to be called, and a timestamp representing when the speechlet component 290a was called (or representing when the system received the user input causing the speechlet component 290a to be called).

The server(s) 120 may determine (404) a type of the invoked speechlet component 290a. The server(s) 120 may use the invoked speechlet component's unique identifier, represented in the data 402, to determine the type of the invoked speechlet component. For example, the server(s) 120 may store a list of speechlet component unique identifiers and each identifier may be associated with data representing the respective speechlet component's type.

The server(s) 120 may encrypt (406) the data 402 using shared secrets stored in a shared secrets storage 408. The shared secrets storage 408 may include various encryption and decryption keys of the system. This prevents the need for subcomponents of the system to store keys. Policies may be instituted that enable a subcomponent to use one or more keys in the shared secrets storage 408, but not all keys stored in the shared secrets storage 408.

The server(s) 120 may store the encrypted data 402 in a speechlet component interactions storage 410. The speechlet component interactions storage 410 may be segmented by speechlet component type. Thus, the encrypted data 402 may be represented within a table, in the speechlet component interactions storage 410, specific to the invoked speechlet component's type determined at step 404.

At runtime, as described in detail below, the system may recommend a speechlet component to a user in response to a user input. The system may recommend a speechlet component to a user using a speechlet offerings speechlet component 290b. When the speechlet offerings speechlet component 290b causes a speechlet component to be offered to a user, the speechlet offerings speechlet component 290b may output data 412 representing the recommended speechlet component. The data 412 may include the recommended speechlet component's unique identifier, a user identifier of the user that originated the user input that caused the speechlet component to be recommended, and a timestamp representing when the speechlet component was recommended (or representing when the system received the user input causing the speechlet component to be recommended).

The data 412 may also represent an outcome of the recommendation. When a speechlet component is recommended to a user, the user may accept the recommendation, resulting in the recommended speechlet component being launched with respect to the user input. Conversely, the user may decline the recommendation. The user's acceptance or decline of the recommendation may be represented in the data 412.

The data 412 may be generated regardless of the modality in which a speechlet component is recommended to the user or the modality in which the user responds to the recommendation. Such modalities include voice user interfaces (VUIs), web-based graphical user interfaces (GUIs), companion application GUIs, etc.

The server(s) 120 may determine (414) a type of the recommended speechlet component. The server(s) 120 may use the recommended speechlet component's unique identifier, represented in the data 412, to determine the type of the recommended speechlet component. For example, the server(s) 120 may store a list of speechlet component unique identifiers and each identifier may be associated with data representing the respective speechlet component's type.

The server(s) 120 may encrypt (416) the data 412 using shared secrets stored in the shared secrets storage 408. The server(s) 120 may store the encrypted data 412 in the speechlet component interactions storage 410. More particularly, the encrypted data 412 may be represented within a table, in the speechlet component interactions storage 410, specific to the recommended speechlet component's type determined at step 414.

The system may implement a companion application that is implemented on devices 110 and that is in communication with the server(s) 120. The companion application may provide a user with a searchable speechlet catalog. The companion application may also display information specific to particular speechlets in the form of banners. The companion application may also use other push notification techniques to notify users of particular speechlet information. A user may enable speechlets using the searchable catalog and by interacting with banners and other push notifications.

When the companion application receives a user input to enable a speechlet, the companion application may send data 420 to the server(s) 120 via an application program interface (API) 418. The data 420 may include the newly enabled speechlet component's unique identifier, a user identifier of the user that caused the speechlet component to be enabled, and a timestamp representing when the companion application received the user input to enable the speechlet component.

The companion application may also send to the server(s) 120, via the API 418, data 420 representing speechlet information the user views/viewed, even if the user does not ultimately enable the speechlet. Such data may include a unique identifier of the speechlet component associated with the viewed information, the user's unique identifier, and a timestamp of when the user viewed the information. The viewed information may correspond to speechlet component information in the searchable catalog and/or information presented via a banner or other push notification. If a user does not enable a speechlet component associated with a displayed banner or push notification, such may be considered as a declined speechlet component recommendation.

The server(s) 120 may determine (422) a type of the enabled speechlet component or speechlet component associated with viewed information. The server(s) 120 may use the speechlet component's unique identifier, represented in the data 420, to determine the type of the speechlet component. For example, the server(s) 120 may store a list of speechlet component unique identifiers and each identifier may be associated with data representing the respective speechlet component's type.

The server(s) 120 may encrypt (424) the data 420 using shared secrets stored in the shared secrets storage 408. The server(s) 120 may store the encrypted data 420 in the speechlet component interactions storage 410. More particularly, the encrypted data 420 may be represented within a table, in the speechlet component interactions storage 410, specific to the speechlet component's type determined at step 422.

The data in the speechlet component interactions storage 410 may be used to determine which speechlet component to recommend to a user, as described in detail below. Thus, it may be beneficial to ensure the speechlet component interactions storage 410 only includes data temporally relevant to recommending a speechlet component to a user. The system may be configured to store data in the speechlet component interactions storage 410 for a limited amount of time (e.g., a day, a week, two weeks, a month, etc. from a timestamp representing when the data was written to the speechlet component interactions storage 410).

As described above, with respect to FIG. 4, the server(s) 120 may store various data relating to various user interactions (and various types of user interactions) with the system. FIG. 5 illustrates how the server(s) 120 may determine which speechlet component(s) 290 to recommend to a user at runtime. The speechlet component recommendation resulting from the processes of FIG. 5 may be represented in further data 412 to be used in later speechlet component recommendations.

As also described above, with respect to FIG. 4, the server(s) 120 may determine the speechlet component type (404/414/422) prior to encrypting the data (406/416/424), thereby enabling the system to segment data in the speechlet component interactions storage 410 based at least on speechlet component type. Alternatively, the server(s) 120 may not determine the speechlet component type prior to encrypting the data. As a result, the data in the storage 410 may not be segmented based on speechlet component type.

As described above with respect to FIG. 2, a user may speak an input to a device 110 and the device 110 may send audio data 211 to the server(s) 120. ASR and NLU may then be performed to determine NLU results data 502 representing an intent of the user. The NLU results data 502 are sent to the orchestrator component 230.

The orchestrator component 230 may determine the audio data 211, representing the user input, originated from a VUI and may be able to determine the user's intent using the NLU results data 420, but may be unable to determine exactly which speechlet component should be called to perform an action(s) responsive to the user input. In this situation, the orchestrator component 230 may send the NLU results data 502 to a VUI service 504. The VUI service 504 may implement a speechlet arbitration service 506 and a speechlet filter service 508.

The speechlet arbitration service 506 determines a type of user intent represented in the NLU results data 502. For example, the speechlet arbitration service 506 may determine a <PlayMusic> intent may correspond to a music type. For further example, the speechlet arbitration service 506 may determine a <PlayGame> intent corresponds to a game or gaming type. For yet further example, the speechlet arbitration service 506 may determine a <BookHotel> intent corresponds to a trip booking type. Other user intents and corresponding types are also possible.

The speechlet arbitration service 506 determines data, in the speechlet component groupings storage 302, associated with the determined type. For example, the data in the speechlet component groupings storage 302 may represent speechlet component identifiers corresponding to the type, with each speechlet component identifier being associated with a predetermined confidence value as described above with respect to FIG. 3.

The speechlet arbitration service 506 also determines data, in the speechlet component interactions storage 410, associated with the user identifier, associated with the user that originated the present user input. The speechlet arbitration service 506 may further determine, of the data associated with the user identifier, data associated with the type corresponding to the user intent. For example, the speechlet arbitration server 506 may determine speechlet component identifiers in the speechlet component interactions storage 410 that are associated with the user identifier and that are associated with speechlet components configured to execute with respect to the present intent of the user.

The speechlet arbitration service 506 reranks the speechlet component identifiers, represented in the data pulled from the speechlet component groupings storage 302, using the data pulled from the speechlet component interactions storage 410. For example, if the speechlet component interactions storage 410 represents the user invoked a particular speechlet component, accepted a previous recommendation to use/enable the particular speechlet component, or enabled the particular speechlet component using a companion application, the speechlet arbitration service 506 may increase the confidence value of the particular speechlet component. Such reranking may boost the confidence values of speechlet components recently invoked or enabled by a user since the speechlet component interactions storage 410 may be configured to store data for a limited amount of time.

For further example, if the speechlet component interactions storage 410 represents the user declined a previous recommendation to use/enable a particular speechlet component, the speechlet arbitration service 506 may decrease the confidence value of the particular speechlet component. For yet further example, if the speechlet component interactions storage 410 represents the user viewed information regarding a particular speechlet component using the companion application, the speechlet arbitration service 506 may increase the confidence value of the particular speechlet component.

The speechlet arbitration service 506 may also rerank speechlet component identifiers, represented in the data pulled from the speechlet component groupings storage 302, using other data specific to the user that originated the present user input. The speechlet arbitration service 506 may communicate with the profile storage 270 to obtain the user specific data.

The speechlet arbitration service 506 may consider user specific speechlet component enablement data. For example, if the user specific data represents a particular speechlet component identifier (represented in the data pulled from the speechlet component groupings storage 302) is enabled by the user, the speechlet arbitration service 506 may increase the confidence value associated with the speechlet component's identifier. For further example, if the user specific data represents a particular speechlet component identifier (represented in the data pulled from the speechlet component groupings storage 302) that the user previously enabled and thereafter disabled, the speechlet arbitration service 506 may decrease the confidence value associated with the speechlet component's identifier. A user's enablement and subsequent disablement of a speechlet component may be considered with more weight than a user's enablement of a speechlet component without subsequent disablement of the speechlet component.

The speechlet arbitration service 506 may also consider speechlet information being presented to the user via the companion application when the user input is received by the system. For example, if a particular speechlet component's information is being presented to the user when the user input is received, the speechlet arbitration service 506 may increase that speechlet component's confidence value.

The speechlet arbitration service 506 may also consider the device 110 from which the user input was received. When the server(s) 120 receives data representing a user input, the server(s) 120 may also receive a device identifier representing the device 110 interacted with by the user. The speechlet arbitration service 506 may use the device identifier to determine input and/or output capabilities of the device 110. The speechlet arbitration service 506 may rerank a speechlet component identifier based on the input and/or output capabilities of the device 110. For example, if the device 110 does not have a screen (or is not associated with an output device that has a screen), the speechlet arbitration service 506 may decrease the confidence value of a speechlet component configured to display content to a user. Conversely, if the device 110 has a screen (or is associated with an output device that has a screen), the speechlet arbitration service 506 may increase the confidence value of a speechlet component configured to display content to a user.

The speechlet arbitration service 506 may also consider user specific data representing the user's system usage history, the user's age, the age of other users associated with the same group profile, as well as other user specific data.

The speechlet arbitration service 506 may also rerank speechlet component identifiers, represented in the data pulled from the speechlet component groupings storage 302, using other data specific to various users of the system, and not specific to the user that originated the present user input. As described above, the confidence values represented in the speechlet component groupings storage 302 may be generated based on input received from individuals employed by an entity that maintains and controls the server(s) 120. Thus, the confidence values may be static values based on information known to an individual prior to users using the speechlet components associated with the confidence values. The speechlet arbitration service 506 may use feedback of various users of the system to increase or decrease the confidence values represented in the data pulled from the speechlet component groupings storage 302. The speechlet arbitration service 506 may also use data representing how many times a particular speechlet component has been invoked by various users of the system in the past threshold amount of time to increase or decrease the particular speechlet component's confidence value.

The speechlet arbitration service 506 generates a list of speechlet component identifiers (that were represented in the data pulled from the speechlet component groupings storage 302) associated with respective updated confidence values. An updated confidence value represents the speechlet arbitration service's confidence that the system should recommend the speechlet component associated with the confidence value.

Users of the system may be split into categories. In one category, a user's speechlet interactions history is ignored in determining the ranked list of speechlet component identifiers. In another category, a user's speechlet interactions history is used to boost the ranking of one or more speechlets in the ranked list. In a further category, a user's speechlet interactions history is used to remove one or more speechlets from the ranked list. Another category may represent that pay-for speechlet components should be boosted in the ranked list of speechlet component identifiers. The strategy documents 512 may represent these different categories. Each strategy document may be associated with one or more user identifiers. The speechlet arbitration service 506 may determine the strategy document associated with the present user identifier and generate the ranked list of speechlet component identifiers based at least in part on the strategy document.

The speechlet arbitration service 506 may implement one or more trained models. The trained model(s) implemented by the speechlet arbitration service 506 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning model requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

A speechlet filter service 508 may filter the ranked list of speechlet component identifiers output by the speechlet arbitration service 506. The speechlet filter service 508 may remove a speechlet component from the ranked listed based on availability. Availability may be based on geographic location. For example, if the user input originated at a device located in Canada, the speechlet filter service 508 may receive speechlet identifiers, associated with speechlets not approved for use in Canada, from the ranked list. Availability may also or alternatively be based on load of a speechlet component (or other endpoint operation). For example, if a speechlet component is operating at or near maximum capacity (e.g., due to the speechlet component presently executing with respect to at least a threshold number of other user inputs of the system) or if the speechlet component is presently not operating, the speechlet filter service 508 may remove that speechlet component's identifier from the ranked list. Availability may also or alternatively be based on an age of the user. The system may be configured with speechlet components that are configured for use by users of a threshold age (e.g., 13 and older, 18 and older, etc.). For example, if the user is 12, the speechlet filter service 508 may remove speechlet component identifiers, associated with speechlet components configured for use by users of age 13 and older, from the ranked list. The speechlet filter service 508 may output a refined ranked list of speechlet component identifiers. The speechlet filter service 508 outputs the refined ranked list of speechlet component identifiers to the VUI service 504.

FIGS. 6A and 6B illustrate the recommendation of a top ranked speechlet component to a user and the processes performed when the user desires the top ranked speechlet component be invoked. The VUI service 504 sends (602) the top ranked speechlet component's identifier to the orchestrator component 230. Alternatively, the VUI service 504 may send, to the orchestrator component 230, the refined list of speechlet component identifiers with associated confidence values.

The orchestrator component 230 performs (604) TTS to generate synthesized speech (e.g., audio data) representing a recommendation to the user to invoke the top ranked speechlet component associated with the top ranked speechlet component identifier. For example, the synthesized speech may correspond to "would you like to play [name of game speechlet component]" in response to the original user input corresponding to a <PlayGame> intent. The orchestrator component 230 sends (606) the audio data to the device 110.

The device 110 outputs (608) audio corresponding to the audio data. Thereafter, the device 110 receives (610) audio representing user speech and sends (612) audio data representing the audio to the orchestrator component 230.

The orchestrator component 230 causes (614) the ASR component 250 to perform ASR processing on the second audio data to generate text data (e.g., ASR results data) representing the second audio data. The orchestrator component 230 causes (616) the NLU component 260 to perform NLU processing on the text data to generate NLU results data. The orchestrator component 230 sends (618) the NLU results data to the VUI service 504.

The VUI service 504 (and more particularly the speechlet arbitration service 506) determines (620) the NLU results data represents the top ranked speechlet component is to be invoked and sends (622) an indicator, representing the top ranked speechlet component is to be invoked, to the orchestrator component 230. The indicator may include the top ranked speechlet component's identifier.

The orchestrator component 230 may determine whether the user's user profile represents the top ranked speechlet component as enabled. If the user profile does not represent the top ranked speechlet component as enabled, the orchestrator component 230 may enable (624) the top ranked speechlet component with respect to the user's user profile.

The orchestrator component 230 calls (626) the top ranked speechlet component to execute with respect to the original user input. For example, the orchestrator component 230 may send, to the top ranked speechlet component, the NLU results data 502 generated with respect to the original user input.

The orchestrator component 230 also stores (628) data representing the recommendation of the top ranked speechlet component and the user's acceptance of the recommendation in the speechlet component interactions storage 410. The orchestrator component 230 may send data representing the recommendation and the user's acceptance to the speechlet offerings speechlet 290b, which may cause the data to be stored in the speechlet component offerings storage 410 according to the description of FIG. 4. This newly stored data may be used for future speechlet recommendations to the user.

FIG. 7 illustrates the processes performed when the user indicates the top ranked speechlet component should not be invoked. After the orchestrator component 230 sends (618) the NLU results data to the VUI service 504, the VUI service 504 determines (702) the user speech represents the top ranked speechlet component should not be invoked. The VUI service 504 determines (704) the next top ranked speechlet component identifier in the refined list output by the speechlet filter service 508 and sends (706) the next top ranked speechlet component identifier to the orchestrator component 230. Steps 702 through 706 may be performed by the speechlet arbitration service 506 of the VUI service 504.

The orchestrator component 230 thereafter causes (708) the device 110 to output a recommendation to invoke the next top ranked speechlet component (e.g., as described with respect to steps 604 through 606 of FIG. 6A).

There may be situations where the VUI service 504 sends, to the orchestrator component 230, data representing more than one speechlet component identifier in the refined ranked list. If the orchestrator component 230 receives more than one ranked speechlet component identifier, in response to determining the user does not want the top ranked speechlet component to be invoked, the orchestrator component 230 may determine the next top ranked speechlet component identifier in the list previously received from the VUI service 504, rather than query the VUI service 504 to provide the next top ranked speechlet component identifier as described with respect to FIG. 7.

As described, the system may recommend a next top ranked speechlet component when the user declines a previous recommendation for a speechlet component. The system may repeat this process until the user accepts a recommendation, until the system has recommended all of the speechlet components represented in the ranked list, or until the user indicates the system should stop recommending speechlet components that can execute with respect to the original user input.

Figure 8:
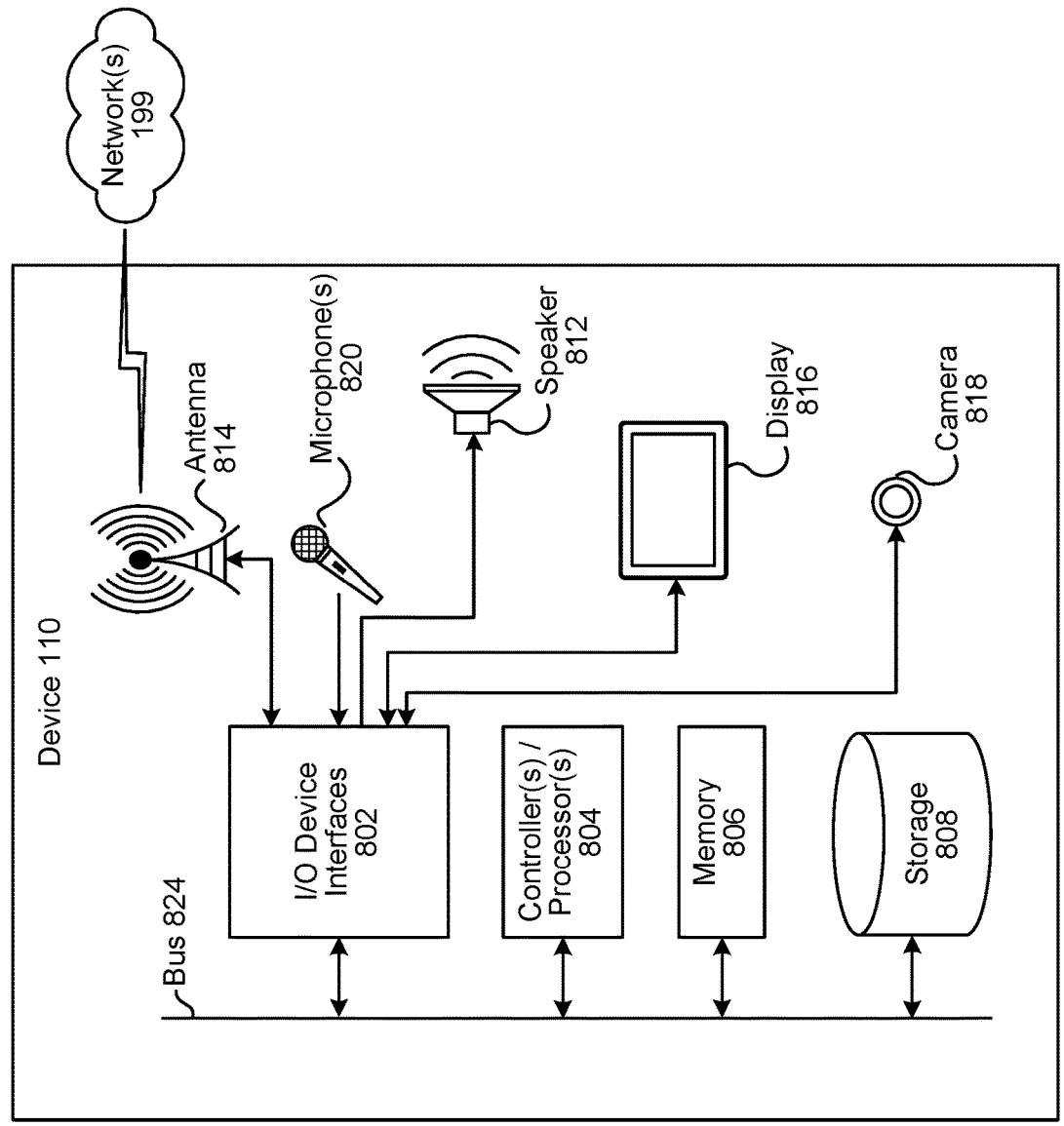
FIG. 8 is a block diagram conceptually illustrating example components of a device according to embodiments of the present disclosure.
Figure 9:
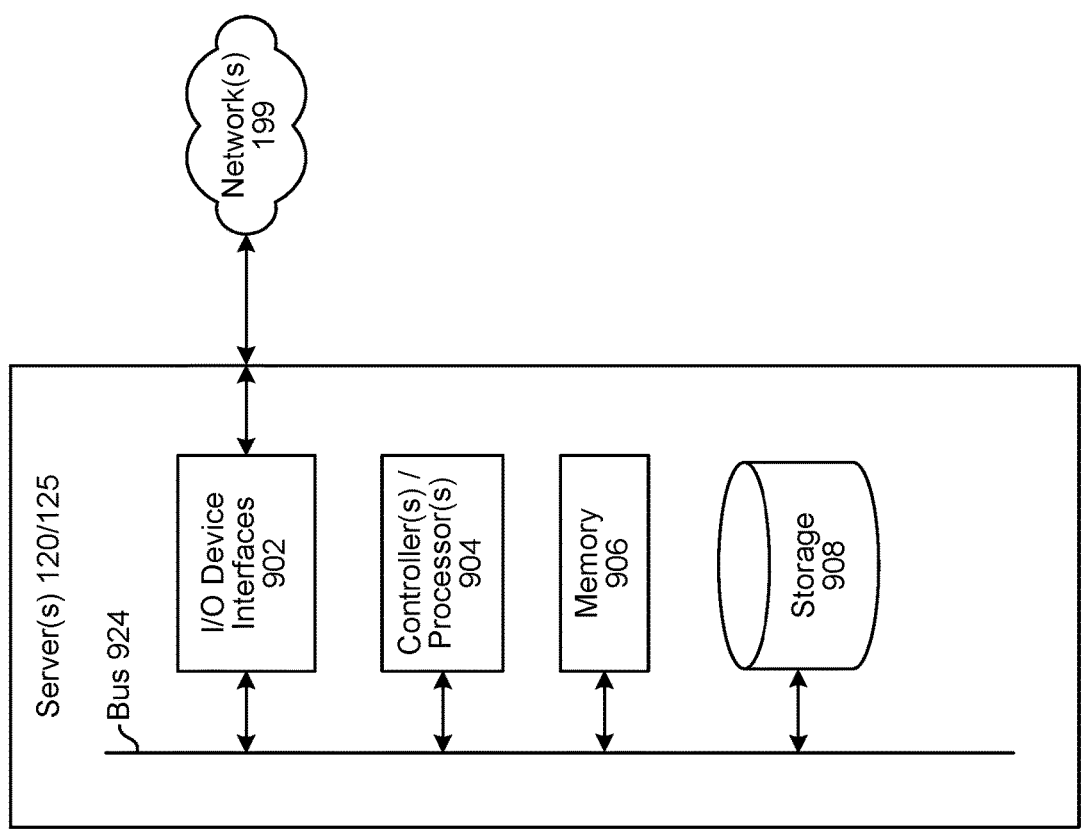
FIG. 9 is a block diagram conceptually illustrating example components of a server according to embodiments of the present disclosure.

FIG. 8 is a block diagram conceptually illustrating a device 110 that may be used with the system. FIG. 9 is a block diagram conceptually illustrating example components of a remote device, such as the server(s) 120, which may assist with ASR processing, NLU processing, etc., or the speechlet server(s) 125. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers 120 may be included in the system, such as one or more servers 120 for performing ASR processing, one or more servers 120 for performing NLU processing, one or more speechlet servers 125 for performing actions responsive to user inputs, etc. In operation, each of these devices (or groups of devices) may include computer-readable and computer-executable instructions that reside on the respective device (110/120/125), as will be discussed further below.

Each of these devices (110/120/125) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/120/125) may also include a data storage component (808/908) for storing data and controller/processor-executable instructions. Each data storage component (808/908) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (802/902).

Computer instructions for operating each device (110/120/125) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120/125) includes input/output device interfaces (802/902). A variety of components may be connected through the input/output device interfaces (802/902), as will be discussed further below. Additionally, each device (110/120/125) may include an address/data bus (824/924) for conveying data among components of the respective device. Each component within a device (110/120/125) may also be directly connected to other components in addition to (or instead of) being connected to other components across the bus (824/924).

Referring to FIG. 8, the device 110 may include input/output device interfaces 802 that connect to a variety of components such as an audio output component such as a speaker 812, a wired headset or a wireless headset (not illustrated), or other component capable of outputting audio. The device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 816 for displaying content. The device 110 may further include a camera 818.

Via antenna(s) 814, the input/output device interfaces 802 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device(s) 110 and the server(s) (120/125) may include their own dedicated processors, memory, and/or storage. Alternatively, one or more of the components of the device(s) 110 and the server(s) (120/125) may utilize the I/O interfaces (802/902), processor(s) (804/904), memory (806/906), and/or storage (808/908) of the device(s) 110 and server(s) (120/125), respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the server(s) (120/125), as described herein, are illustrative, and may be located as a stand-alone device or may be included, in whole or in part, as a component of a larger device or system.

Figure 10:
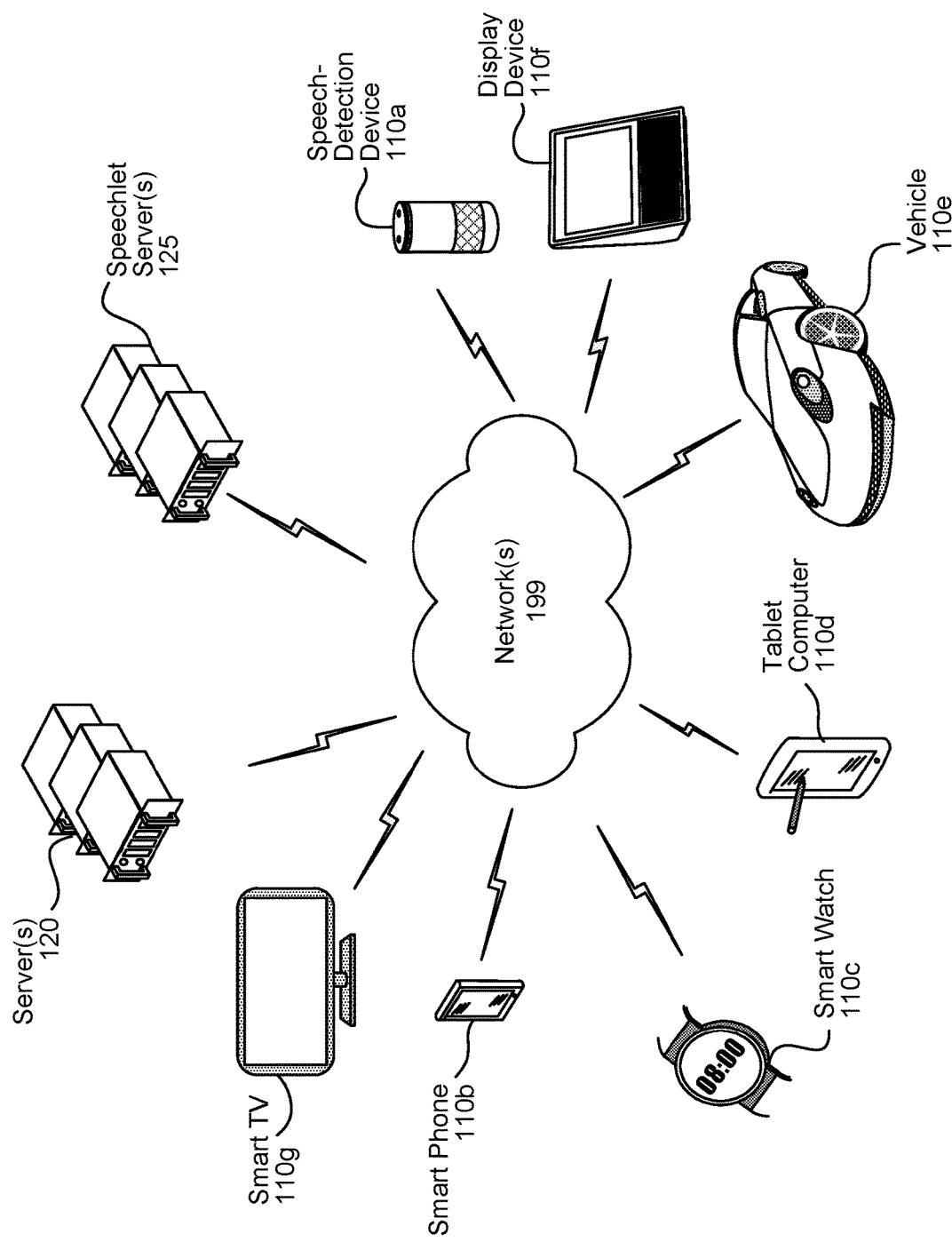
FIG. 10 illustrates an example of a network of devices according to embodiments of the present disclosure.

As illustrated in FIG. 10, multiple devices (110a-110g, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, and/or a smart television 110g may be connected to the network(s) 199 through a wireless service provider, over a WiFi or cellular network connection, or the like. Other devices are included as network-connected support devices, such as the server(s) 120, the speechlet server(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method, comprising:
receiving, from a first device, first audio data representing first speech;
determining audio characteristics of the first audio data;
determining the audio characteristics correspond to stored audio characteristics associated with a user identifier;
performing automatic speech recognition (ASR) processing on the first audio data to generate first text data;
performing natural language understanding (NLU) processing on the first text data to generate NLU results data, the NLU results data including an indicator representing an intent;
determining the intent corresponds to a type of speechlet component;
determining, in a first database, first data representing a first speechlet component and a first confidence value representing a reliability of processing performed by the first speechlet component, the first speechlet component corresponding to the type;
determining, in the first database, second data representing a second speechlet component and a second confidence value representing a reliability of processing performed by the second speechlet component, the second speechlet component corresponding to the type;
determining, in a second database, third data representing a previous instance when the first speechlet component was recommended to a user, associated with the user identifier, and the user accepted the recommendation;
generating an updated first confidence value based at least in part on the third data, the updated first confidence value being greater than the first confidence value, the updated first confidence value representing a likelihood that the first speechlet component is to be invoked to execute with respect to the NLU results data;
determining the updated first confidence value is greater than the second confidence value;
based at least in part on the updated first confidence value being greater than the second confidence value, generating second text data naming the first speechlet component and requesting a further indication that the first speechlet component be invoked to execute with
respect to the NLU results data;
performing text-to-speech (TTS) processing on the second text data to generate second audio data;
causing the first device to output audio representing the second audio data;
receiving, from the first device after causing the first device to output the audio, third audio data representing second speech;
determining the second speech represents the first speechlet component is to be invoked to execute with respect to the NLU results data; and
sending the NLU results data to the first speechlet component.

2. The method of claim 1, further comprising:
generating fourth data including a unique identifier associated with the first speechlet component, the user identifier, a timestamp representing when the first device output the audio, and a second indicator representing the first speechlet component was invoked to execute with respect to the NLU results data;
storing the fourth data in the second database;
receiving, from the first device after storing the fourth data, fourth audio data representing third speech;
performing ASR processing on the fourth audio data to generate third text data;
performing NLU processing on the third text data to generate second NLU results data, the second NLU results data including a third indicator representing a second intent;
determining the second intent corresponds to the type of speechlet component;
determining the first data after determining the second intent corresponds to the type;
receiving the fourth data from the second database after determining the second intent corresponds to the type; and
generating a third confidence value based at least in part on the fourth data and the first confidence value.

3. The method of claim 1, further comprising:
determining fourth data representing content displayed on a screen of a second device via a companion application when the first audio data is received;
determining the fourth data includes a second indicator of the first speechlet component; and
generating the updated first confidence value further based at least in part on the fourth data including the second indicator.

4. The method of claim 1, further comprising:
receiving, from the first device, fourth audio data representing third speech;
performing ASR processing on the fourth audio data to generate third text data;
performing NLU processing on the third text data to generate second NLU results data, the NLU results data including a second indicator representing a second intent;
determining the second intent corresponds to the type of speechlet component;
determining, in the first database, the first data;
determining, in the first database, the second data;
determining the first confidence value is greater than the second confidence value;
causing the first device to output second audio including first synthesized speech naming the first speechlet component and requesting a second indication that the first speechlet component be invoked to execute with respect to the second NLU results data;
receiving, from the first device after causing the first device to output the second audio, fifth audio data representing fourth speech;
determining the fourth speech represents the first speechlet component is to be ignored with respect to the second NLU results data; and
causing the first device to output third audio including second synthesized speech naming the second speechlet component and requesting a third indication that the second speechlet component be invoked to execute with respect to the second NLU results data.

5. A method, comprising:
receiving, from a first device, first audio data representing first speech;
determining a user identifier associated with the first audio data;
performing speech processing with respect to the first audio data to generate an indicator representing an intent;
determining the intent corresponds to a type of speechlet component;
determining first data representing a first speechlet component and a first confidence value, the first speechlet component corresponding to the type;
determining second data representing a second speechlet component and a second confidence value, the second speechlet component corresponding to the type;
determining third data representing a system usage history associated with the user identifier;
generating an updated first confidence value based at least in part on the third data;
determining the updated first confidence value is greater than the second confidence value;
based at least in part on the updated first confidence value being greater than the second confidence value, causing the first device to output audio including first synthesized speech naming the first speechlet component and requesting a first indication that the first speechlet component be invoked to execute with respect to the indicator;
receiving, from the first device, second audio data representing second speech;
determining the second speech represents the first speechlet component is to be invoked; and
sending the indicator to the first speechlet component.

6. The method of claim 5, further comprising:
generating fourth data representing the indicator was sent to the first speechlet component;
storing the fourth data in a database;
receiving, from the first device after storing the fourth data, third audio data representing third speech;
performing speech processing with respect to the third audio data to generate a second indicator representing a second intent;
determining the second intent corresponds to the type of speechlet component;
determining the first data after determining the second intent corresponds to the type;
receiving the fourth data from the database after determining the second intent corresponds to the type; and
generating a third confidence value based at least in part on the fourth data and the first confidence value.

7. The method of claim 5, further comprising:
determining fourth data representing content displayed on a screen of a second device when the first audio data is received;
determining the fourth data includes a second indicator of the first speechlet component; and
generating the updated first confidence value further based at least in part on the fourth data.

8. The method of claim 5, further comprising:
receiving, from the first device, third audio data representing third speech;
performing speech processing with respect to the third audio data to generate a second indicator representing a second intent;
determining the second intent corresponds to the type of speechlet component;
determining the first data after determining the second intent corresponds to the type;
determining the second data after determining the second intent corresponds to the type of speechlet component;
determining the first confidence value is greater than the second confidence value;
causing the first device to output second audio including second synthesized speech naming the first speechlet component and requesting a second indication that the first speechlet component be invoked to execute with respect to the second indicator;
receiving, from the first device after causing the first device to output the second audio, fourth audio data representing fourth speech;
determining the fourth speech represents the first speechlet component is to be ignored with respect to the second indicator; and
causing the first device to output third audio including third synthesized speech naming the second speechlet component and requesting a third indication that the second speechlet component be invoked to execute with respect to the second indicator.

9. The method of claim 5, further comprising:
generating text data representing a name of the first speechlet component and a request for the first indication; and
performing text-to-speech (TTS) processing on the text data to generate the first synthesized speech.

10. The method of claim 5, further comprising:
determining user profile data associated with the user identifier;
determining, in the user profile data, fourth data representing enabled speechlet components;
determining the first speechlet component is missing from the fourth data; and
after determining the second speech represents the first speechlet component is to be invoked, causing the first speechlet component to be represented as an enabled speechlet component in the fourth data.

11. The method of claim 5, further comprising:
determining fourth data representing a third speechlet component and a third confidence value, the third speechlet component corresponding to the type;
determining that the first device has previously output, within a past threshold amount of time, a request for an indication that the third speechlet component be invoked to execute with respect to a previous user input; and
based at least in part on the first device having previously output the request within the past threshold amount of time, removing the third speechlet component from general speechlet consideration with respect to the indicator.

12. The method of claim 5, further comprising:
performing automatic speech recognition (ASR) processing on the second audio data to generate text data;
performing natural language understanding (NLU) processing on the text data to generate NLU results data; and
determining the NLU results data represents the first speechlet component is to be invoked.

13. A computing system, comprising:
at least one processor; and
at least one memory comprising instructions that, when executed by the at least one processor, cause the system to:
receive, from a first device, first audio data representing first speech;
determine a user identifier associated with the first audio data;
perform speech processing with respect to the first audio data to generate an indicator representing an intent;
determine the intent corresponds to a type of speechlet component;
determine first data representing a first speechlet component and a first confidence value, the first speechlet component corresponding to the type;
determine second data representing a second speechlet component and a second confidence value, the second speechlet component corresponding to the type;
determine third data representing a system usage history associated with the user identifier;
generate an updated first confidence value based at least in part on the third data;
determine the updated first confidence value is greater than the second confidence value;
based at least in part on the updated first confidence value being greater than the second confidence value, cause the first device to output audio including synthesized speech naming the first speechlet component and requesting a first indication that the first speechlet component be invoked to execute with respect to the indicator;
receive, from the first device, second audio data representing second speech;
determine the second speech represents the first speechlet component is to be invoked; and
send the indicator to the first speechlet component.

14. The computing system of claim 13, wherein the at least one memory further comprises instructions that, when executed by the at least one processor, further cause the system to:
generate fourth data representing the indicator was sent to the first speechlet component;
store the fourth data in a database;
receive, from the first device after storing the fourth data, third audio data representing third speech;
performing speech processing with respect to the third audio data to generate a second indicator representing a second intent;
determine the second intent corresponds to the type of speechlet component;
determine the first data after determining the second intent corresponds to the type;
receive the fourth data from the database after determining the second intent corresponds to the type; and generate a third confidence value based at least in part on the fourth data and the first confidence value.

15. The computing system of claim 13, wherein the at least one memory further comprises instructions that, when executed by the at least one processor, further cause the system to:
    determine fourth data representing content displayed on a screen of a second device when the first audio data is received;
    determine the fourth data includes a second indicator of the first speechlet component; and
    generate the updated first confidence value further based at least in part on the fourth data.

16. The computing system of claim 13, wherein the at least one memory further comprises instructions that, when executed by the at least one processor, further cause the system to:
    receive, from the first device, third audio data representing third speech;
    perform speech processing with respect to the third audio data to generate a second indicator representing a second intent;
    determine the second intent corresponds to the type of speechlet component;
    determine the first data after determining the second intent corresponds to the type;
    determine the second data after determining the second intent corresponds to the type of speechlet component;
    determine the first confidence value is greater than the second confidence value;
    cause the first device to output second audio including second synthesized speech naming the first speechlet component and requesting a second indication that the first speechlet component be invoked to execute with respect to the second indicator;
    receive, from the first device after causing the first device to output the second audio, fourth audio data representing fourth speech;
    determine the fourth speech represents the first speechlet component is to be ignored with respect to the second indicator; and
    cause the first device to output third audio including third synthesized speech naming the second speechlet component and requesting a third indication that the second speechlet component be invoked to execute with respect to the second indicator.

17. The computing system of claim 13, wherein the at least one memory further comprises instructions that, when executed by the at least one processor, further cause the system to:
    generate text data representing a name of the first speechlet component and a request for the first indication; and
    perform text-to-speech (TTS) processing on the text data to generate the first synthesized speech.

18. The computing system of claim 13, wherein the at least one memory further comprises instructions that, when executed by the at least one processor, further cause the system to:
    determine user profile data associated with the user identifier;
    determine, in the user profile data, fourth data representing enabled speechlet components;
    determine the first speechlet component is missing from the fourth data; and
    after determining the second speech represents the first speechlet component is to be invoked, causing the first speechlet component to be represented as an enabled speechlet component in the fourth data.

19. The computing system of claim 13, wherein the at least one memory further comprises instructions that, when executed by the at least one processor, further cause the system to:
    determine fourth data representing a third speechlet component and a third confidence value, the third speechlet component corresponding to the type;
    determine that the first device has previously output, within a past threshold amount of time, a request for an indication that the third speechlet component be invoked to execute with respect to a previous user input; and
    based at least in part on the first device having previously output the request within the past threshold amount of time, remove the third speechlet component from general speechlet consideration with respect to the indicator.

20. The computing system of claim 13, wherein the at least one memory further comprises instructions that, when executed by the at least one processor, further cause the system to:
    perform automatic speech recognition (ASR) processing on the second audio data to generate text data;
    perform natural language understanding (NLU) processing on the text data to generate NLU results data; and
    determine the NLU results data represents the first speechlet component is to be invoked.

* * * * *